United States Patent
Lobo Casanova

(10) Patent No.: US 11,298,898 B2
(45) Date of Patent: Apr. 12, 2022

(54) CHASSIS COMPONENT IN FIBER PLASTIC COMPOSITE MONO CONSTRUCTION WITH DUROPLASTIC MATRIX MATERIAL AND METHOD FOR THE PRODUCTION THEREOF

(71) Applicant: ZF Friedrichshafen AG, Friedrichshafen (DE)

(72) Inventor: Ignacio Lobo Casanova, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 95 days.

(21) Appl. No.: 16/339,965

(22) PCT Filed: Sep. 7, 2017

(86) PCT No.: PCT/EP2017/072432
§ 371 (c)(1),
(2) Date: Jun. 18, 2019

(87) PCT Pub. No.: WO2018/065165
PCT Pub. Date: Apr. 12, 2018

(65) Prior Publication Data
US 2020/0094498 A1 Mar. 26, 2020

(30) Foreign Application Priority Data
Oct. 5, 2016 (DE) .......................... 102016219303.1

(51) Int. Cl.
*B60G 7/00* (2006.01)
*B29C 70/84* (2006.01)
(Continued)

(52) U.S. Cl.
CPC .............. *B29C 70/84* (2013.01); *B29C 70/50* (2013.01); *B29C 70/681* (2013.01); *B60G 7/001* (2013.01); *B62D 7/146* (2013.01)

(58) Field of Classification Search
CPC ........................ B60G 2206/7101; B60G 7/001
See application file for complete search history.

(56) References Cited

U.S. PATENT DOCUMENTS

| 4,091,061 A | 5/1978 | Turbier et al. |
| 4,753,456 A * | 6/1988 | Booher .................. B29C 70/52 |
| | | 280/124.134 |

(Continued)

FOREIGN PATENT DOCUMENTS

| DE | 3744479 A1 | 7/1989 |
| DE | 10 2007 015 615 A1 | 10/2008 |

(Continued)

OTHER PUBLICATIONS

Thomas Dorfler, Trailing arm for a wheel suspension as well as wheel suspension with trailing arm, Jul. 8, 2016, EPO, DE 20 2016 103 191 U1, Machine Translation of Description (Year: 2016).*

(Continued)

*Primary Examiner* — James A English
(74) *Attorney, Agent, or Firm* — Crowell & Moring LLP

(57) ABSTRACT

A fiber-reinforced plastic chassis may include a steering element, where the steering element comprises at least one reinforcement structure formed with continuous fibers, where the steering element comprises at least one stiffening structure formed with short and/or long fibers, where the at least one reinforcement structure is formed integrally with the at least one stiffening structure via a thermosetting matrix material, and where the steering element comprises a plurality of bearing receivers integrated in at least one of the (Continued)

at least one reinforcement structure and the at least one stiffening structure for receiving bearing elements.

12 Claims, 4 Drawing Sheets

(51) Int. Cl.
    *B29C 70/50*     (2006.01)
    *B29C 70/68*     (2006.01)
    *B62D 7/14*     (2006.01)

(56) References Cited

U.S. PATENT DOCUMENTS

| | | | |
|---|---|---|---|
| 2004/0046380 A1* | 3/2004 | Graber | B60G 7/001 |
| | | | 280/782 |
| 2014/0210177 A1* | 7/2014 | Dicke | B60G 7/001 |
| | | | 280/124.134 |
| 2017/0210187 A1* | 7/2017 | Meyer | B60G 7/005 |
| 2017/0210188 A1* | 7/2017 | Meyer | B29C 37/0085 |
| 2019/0315088 A1* | 10/2019 | Bomphray | B32B 27/36 |

FOREIGN PATENT DOCUMENTS

| | | |
|---|---|---|
| DE | 10 2007 015 616 A1 | 10/2008 |
| DE | 10 2011 003 971 A1 | 8/2012 |
| DE | 10 2011 010 367 A1 | 8/2012 |
| DE | 10 2012 213 664 A1 | 2/2014 |
| DE | 10 2013 007 284 A1 | 10/2014 |
| DE | 10 2013 208 278 A1 | 11/2014 |
| DE | 20 2014 105 548 U1 | 2/2015 |
| DE | 20 2016 103 191 U1 | 8/2016 |
| EP | 2 759 423 A1 | 7/2014 |
| WO | WO 2017/137187 A1 | 8/2017 |

OTHER PUBLICATIONS

Kleinknecht et al., Fiber composite component for a vehicle, Nov. 6, 2014, EPO, DE 10 2013 208 278 A1, Machine Translation of Description (Year: 2014).*

Meyer et al., Fiber composite Hybrid Control Arm, Aug. 16, 2012, EPO, DE 10 2011 003 971 A1, Machine Translation of Description (Year: 2012).*

International Search Report and Written Opinion of the International Search Authority dated Dec. 17, 2017 in International Application No. PCT/EP2017/072432 (English and German languages) (23 pp.).

Friedrich, Horst E. Hrsg., Eggers, Uwe et al., "Werkstoff- und Halbzeugtechnologien für Leichtbau-Anwendungen," ISBN: 978-3-8348-2110-2, Springer Viewing 2014, title pg., p. 443, pp. 594-598 (7 pp.).

Friedrich, Horst E. Hrsg., Eggers, Uwe et al., "Werkstoff- und Halbzeugtechnologien für Leichtbau-Anwendungen," ISBN: 978-3-8348-2110-2, Springer Viewing 2014, title pg., p. 443, pp. 610-612 (5 pp.).

\* cited by examiner

CHASSIS COMPONENT IN FIBER PLASTIC COMPOSITE MONO CONSTRUCTION WITH DUROPLASTIC MATRIX MATERIAL AND METHOD FOR THE PRODUCTION THEREOF

RELATED APPLICATIONS

This application is a filing under 35 U.S.C. § 371 of International Patent Application PCT/EP2017/072432, filed Sep. 7, 2017, and claiming priority to German Patent Application 10 2016 219 303.1, filed Oct. 5, 2016. All applications listed in this paragraph are hereby incorporated by reference in their entireties.

TECHNICAL FIELD

The invention relates to a fiber-reinforced plastic chassis component, in particular a wheel steering element.

The invention also relates to a method for producing such a chassis component.

BACKGROUND

Chassis components formed entirely or in part of a fiber-reinforced plastic are known from the prior art. In comparison with pure metal variations, these are lighter, have a greater design freedom, are less prone to corrosion, and can frequently also be produced more simply A hybrid construction triangular steering element is known from DE 10 2007 015 616 A1 that has a base element made of sheet metal, and a plastic element permanently connected to the base element. The plastic element reinforces the base element and preferably has a grid structure, which is located in particular in a shell-like recess in the base element. The plastic is preferably reinforced with fibers, e.g. glass fibers. The plastic can be a polyamide (thermoplastic).

DE 10 2011 003 971 A1 describes a steering element that is formed by a substantially box-shaped deep-drawn profile carrier with a continuous fiber reinforcement and a filling material located therein made of an injection molded plastic. Continuous fiber-reinforced pre-pregs made of curable plastics, e.g. epoxy resin, can be used for the deep-drawn profile carrier. The profile carrier material is preferably a deep-drawn plate-shaped semi-finished product made of a continuous fiber-reinforced thermoplastic. The filling material can be made of a short or long fiber-reinforced thermoplastic material.

BRIEF DESCRIPTION OF THE DRAWINGS

The present embodiments shall be explained in greater detail below in reference to the drawings. The features shown in the drawings and/or explained below can form general features of the present embodiments, and further develop certain embodiments, independently of the concrete combinations of features.

DETAILED DESCRIPTION

Figure 1:
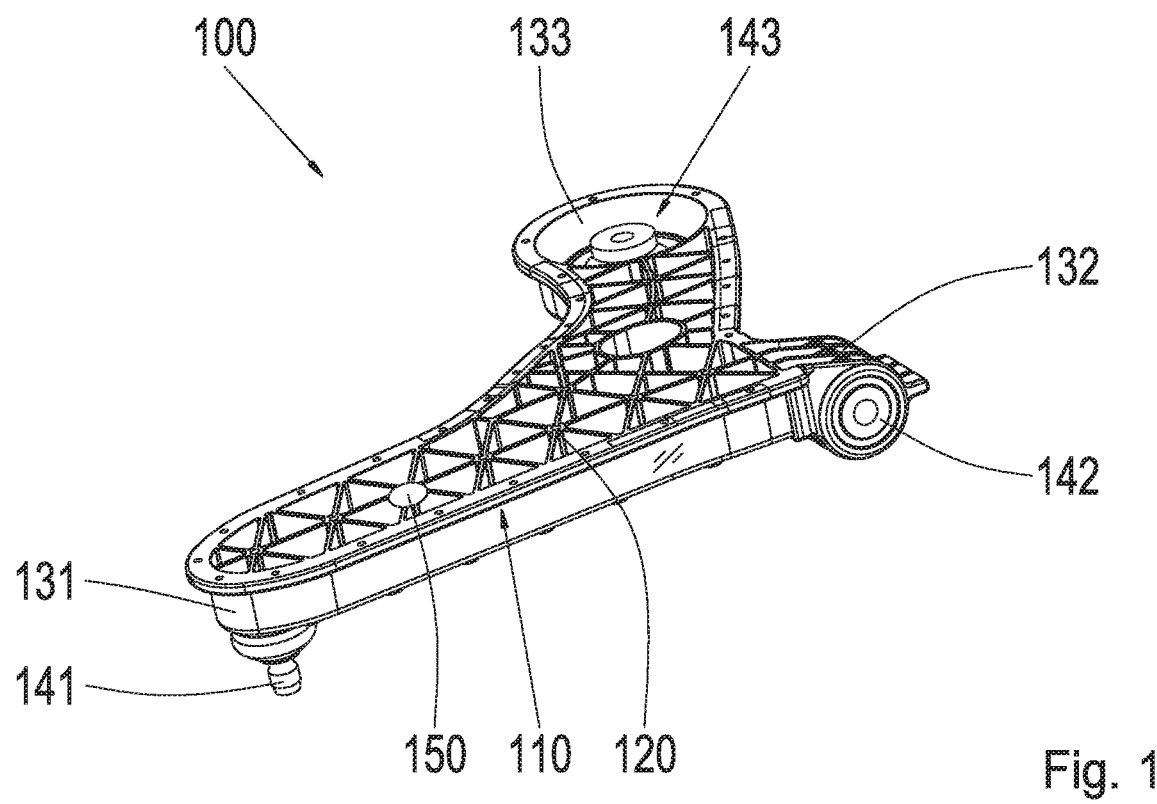
FIG. 1 shows a chassis component.

An object of the invention is create a chassis component made substantially of only a fiber-reinforced plastic, which can accommodate loads and can be produced inexpensively.

The chassis component according to the invention is characterized in that, in an integral design comprising (exclusively) a thermoset matrix material, it has at least one reinforcement structure formed with continuous fibers (continuous fiber reinforcement structure), at least one stiffening structure formed with short and/or long fibers (short/long fiber stiffening structure) and numerous bearing receivers integrated in the reinforcement structure and/or stiffening structure for receiving bearing elements.

This is preferably a wheel steering element, in particular a transverse steering element with a 2-point steering geometry or 3-point steering geometry, e.g. in a Y-, A-, L- or U-shape. By way of example, this can be a suspension strut wheel mount.

The integrated bearing receivers secure bearing elements, e.g. ball joints or ball pins, bearing pins, rubber or elastomer bearings, etc., to the chassis component in order to structurally incorporate the chassis component in the motor vehicle, in particular a passenger car. This normally comprises joints with different joint functions (e.g. swivel joints, ball joints, etc.). The bearing receivers thus form force transmission or force application points (kinematic points) in the chassis component. Advantageously, the configuration of the integrated bearing receivers can be substantially freely determined with regard to their orientation (horizontal, vertical or diagonal) in the construction of the chassis component.

The chassis component according to the invention has at least three different functional areas (reinforcement structure, stiffening structure, and bearing receivers) and also has an integral structure, i.e. it is produced as a single unit, in particular in an initial production process, as claimed, e.g. in the coordinate independent claim. The continuous fiber reinforcement can have a substantially free design, in order to adapt it to the load characteristics of the chassis component, and results in excellent mechanical properties regarding this load characteristic. Not only the geometry of the continuous fiber reinforcement structure, but also the number of continuous fiber reinforcement structures can be varied. The short and/or long fiber reinforcement of the stiffening structure stiffens the reinforcement structure and allows for both a great deal of freedom in design (the geometric structure can be freely designed in terms of lightweight structural technology for each load), as well as a shortening of the process chain by combining numerous process steps. As a result of the structured integral construction with different functional areas, the mechanical requirements for the chassis component are fully satisfied, despite the lower weight. Furthermore, bonding agents or suchlike, as well as form fitting connecting concepts between the individual functional areas are not absolutely necessary, thus simplifying the production and the structural construction.

The chassis component according to the invention is substantially made entirely or completely of a fiber-reinforced plastic material (FRP), which can also be referred to as an FRP mono-construction (in contrast to a hybrid construction, comprising metal and FRP, for example), or a full FRP construction. This results in substantially homogenous mechanical properties. Stiffness and stability jumps resulting from different e-modules, or tensile/pressure strengths are substantially eliminated. The expansion coefficients are also substantially identical, such that a good temperature and climate change stability is obtained. As a result of the integral fiber-reinforced plastic construction, there are also advantages for recycling.

Carbon or glass fibers with different fiber lengths are used primarily for the reinforcement fibers. The short fibers can have a length of up to ca. 1 mm. The long fibers can have a length of up to 50 mm. The continuous fibers then have a length of more than 50 mm. A thermosetting plastic or a thermosetting plastic material, e.g. epoxy resin, vinyl ester resin, or polyurethane, are used exclusively for the matrix material, where it should be noted that thermosetting matrix materials are more thermally stable (in terms of both stiffness and strength) and structurally stable than thermoplastic matrix materials.

The reinforcement structure can be formed by a layered structure optimized for the load, that has numerous continuous fiber layers. The layered structure can be selected freely, taking into account the respective ancillary conditions. The fibers are preferably oriented in the same direction inside each layer (unidirectional core). The layered construction can then be constructed with identical fiber orientations (i.e. 0°) or different fiber orientations in each layer (e.g. 0°, +45°, −45°, 90°, 90°, −45°, +45°, 0°).

The stiffening structure formed with short and/or long fibers is preferably a ribbed structure, or at least has a ribbed structure thereon. A ribbed structure reinforced with short and/or long fibers is light and stable. There is also a great deal of design freedom.

The reinforcement structure can be in any form suitable for the load and/or component geometry. The reinforcement structure can also simply be a plate. The reinforcement structure can be half-shell formed by numerous continuous fiber layers, and the stiffening structure can be a ribbed structure formed in this half-shell. The half-shell is then braced and stiffened by the ribbed structure. As a result, an excellent stiffness is obtained, in particular with regard to bending and twisting.

The chassis component according to the invention can have at least one (integral) functional element formed thereon, formed preferably on or in the short and/or long fiber-reinforced stiffening structure. This is, e.g., a sealing bellows groove, a fastening clip, a wind deflector, a rock guard, etc.

The chassis component according to the invention can have at least one load sensor, which can be incorporated in the initial production of the chassis component. The load sensor can be embedded directly in the fiber-reinforce plastic material of the stiffening structure and/or the reinforcement structure. Changes in the fiber-reinforced plastic structure can be detected with such a load sensor, and overloads or excess stresses in particular can be detected.

The chassis component can have at least one integrated elastomeric element or elastomer element, which can already be incorporated in the initial production of the chassis component. The elastomeric element can have an internal elastomer layer, i.e. embedded in the fiber-reinforced plastic, which dampens sound and/or vibrations. Such an internal elastomer layer can be a component of a layered construction of the reinforcement structure, or it can be embedded in the stiffening structure, or it can be located between the reinforcement structure and the stiffening structure. The elastomeric element can also be an external elastomer layer, protecting against impacts or chipping, and/or reducing the acoustic emissions.

The method for producing a chassis component according to the invention comprises the following steps:

preparing or prefabricating at least one blank containing a continuous fiber;

placing the blank in the cavity of an open compression mold;

optionally also placing at least one load sensor, elastomer element and/or bearing element in the cavity of the open compression mold, closing the compression mold and executing a compression while adding a thermosetting plastic material containing short and/or long fibers, which is subsequently distributed over the contour of the cavity; and curing the plastic material, typically through heating (heat curing) and under pressure, opening the compression mold, and removing the chassis component from the mold.

The chassis component is thus produced as an integral part in an initial production, and optionally in shaping steps, in a compression mold with an appropriately formed cavity. This production method can also be referred to as a "one-shot" process, and has a comparatively very short process chain. The typically pre-heated compression mold is incorporated in a press or suchlike. The cavity of the compression mold can have cavity sections for generating functional elements formed thereon.

The chassis component that is produced is substantially ready to be installed after it has been removed from the compression mold. Before installation in a motor vehicle, bearing elements may have to be inserted or seated in the integrated bearing receivers. Alternatively, the bearing elements can already be integrated in the bearing receivers in the initial production of the chassis component, which are then permanently embedded in the fiber-reinforced plastic.

The at least one blank is prefabricated and can be formed from a dry, continuous fiber textile semi-finished product (e.g. a fabric, core, in particular a unidirectional core, spacer fabric, nonwoven, etc.) or a pre-impregnated continuous fiber semi-finished product (a so-called pre-preg or tow-preg), and can comprise a single fiber layer or numerous fiber layers, in particular with different fiber orientations. The prefabricated blank can also have at least one load sensor and/or at least one elastomeric element, e.g. an elastomer layer. The blank can be flat, and can be shaped when the compression mold is closed, for example. The blank can also already be pre-shaped (a so-called preform). A preform can be obtained, for example, with the RTM method (Resin Transfer Molding) or the PCM method (pre-preg compression molding). The plastic contained in the blank melts during the compression process, or the blank is infiltrated by the plastic that is added (i.e. the continuous fibers are embedded in the thermosetting plastic material already contained therein, or added thereto), or the added plastic bonds in a material bonding manner to the blank (depending on which pre-product is used), wherein the reinforcement structure is formed by the blank.

The thermosetting plastic material containing short and/or long fibers can already be placed in the cavity of the compression mold prior to the compression process, e.g. in the form of an SMC (Sheet Molding Compound) or BMC (Bulk Molding Compound). The thermosetting plastic material containing long and/or short fibers can also first be introduced in the cavity during the compression process through injection molding or suchlike. The initially still liquid thermosetting plastic material (normally a resin; see above) hardens during the continued compression (optionally in a subsequent compression phase), and forms the stiffening structure. The integrated bearing receivers are also preferably formed from the plastic containing short and/or long fibers, or at least co-formed. Any functional elements are also preferably formed from this plastic containing short and/or long fibers. Any elastomer elements, sensors, and/or bearing elements are also preferably embedded in this plastic that contains short and/or long fibers.

At least one bearing receiver can be obtained through a cutting of the blank in strips, shaping the strips to form a bushing, and stiffening the bushing through the thermosetting plastic material that contains short and/or long fibers. A bearing bushing produced in this manner is particularly robust.

FIG. 1 shows a 3-point steering element 100 with an L-construction, substantially made only from a fiber-reinforced plastic with a thermosetting matrix material. The steering element 100 has an integral reinforcement structure 110 with a continuous fiber-reinforcement in the form of a half-shell or a bowl element, and a stiffening structure 120 in the form of a ribbed structure, with short and/or long fiber reinforcement. The reinforcement structure 110 and the stiffening structure 120 are integral components. The steering element 100 also has three bearing receivers 131, 132, 133 integrated in the reinforcement structure 110 and the stiffening structure 120, for receiving bearing elements. The bearing receivers 131 and 133 are in the form of bearing seats, and the bearing receiver 132 is in the form of a bearing bushing. The bearing elements are a ball pin 141, a first rubber bearing 142, and a second rubber bearing 143. The bearing elements 141, 142, and 143 can be installed later, or already embedded in the initial production of the steering element 100 (see FIG. 3). The steering element 100 also has a load sensor 150 embedded in the ribbed structure 120. The steering element 100 can also has an elastomer layer, not shown, as described above.

Figure 2:
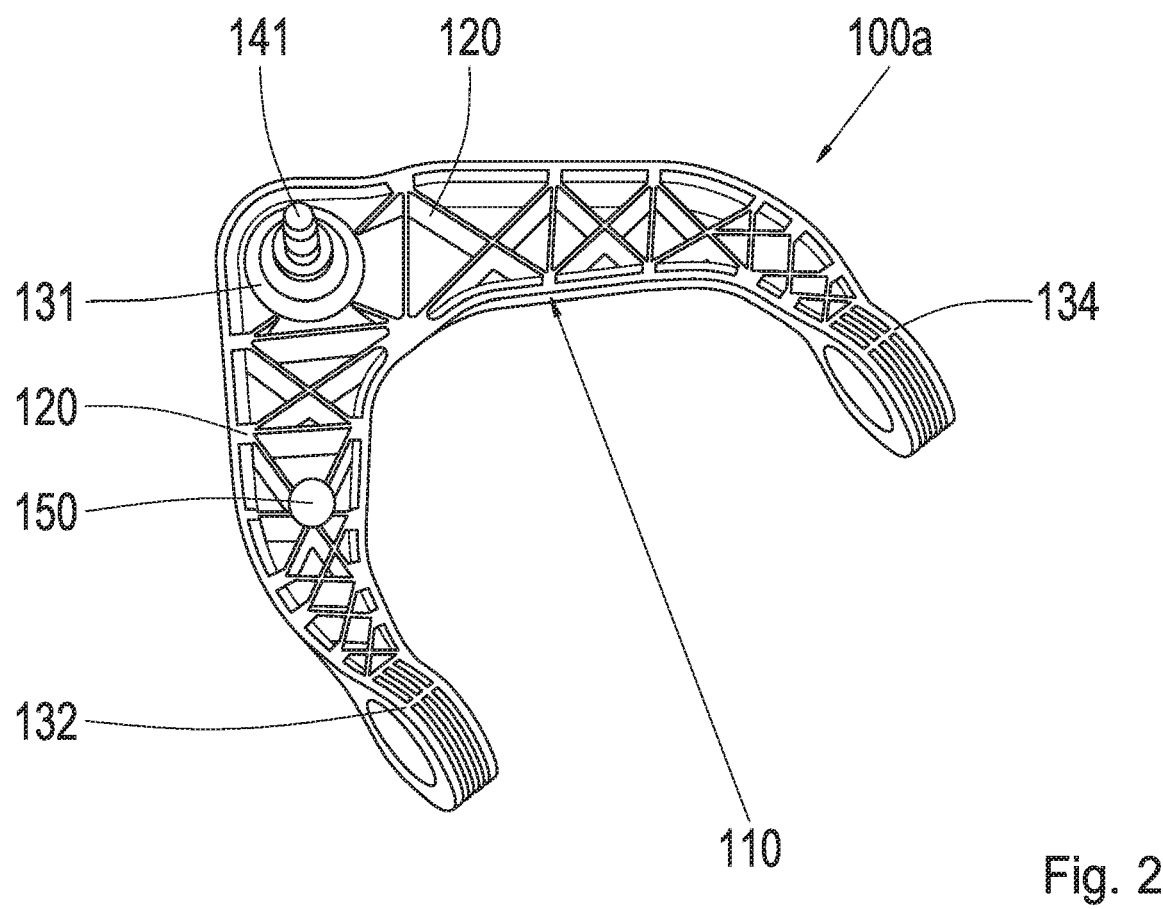
FIG. 2 shows another chassis component.

The 3-point steering element 100a shown in FIG. 2 has a U-structure. Analogous to the steering element 100 shown in FIG. 1, the steering element 100a has an integral reinforcement structure 110 with a continuous fiber-reinforcement in the form of a half-shell, and a stiffening structure 120 with short and/or long fiber-reinforcement in the form of a ribbed structure. The steering element 100 also has three bearing receivers 131, 132, and 134. The middle bearing receiver 131 is in the form of a bearing seat, and has a bearing pin 141 located therein. The bearing receivers 132 and 134 located on the leg ends are formed as bearing bushings for receiving rubber bearings (not shown). The steering element 100 also has a load sensor 150 embedded in the ribbed structure 120.

Figure 3:
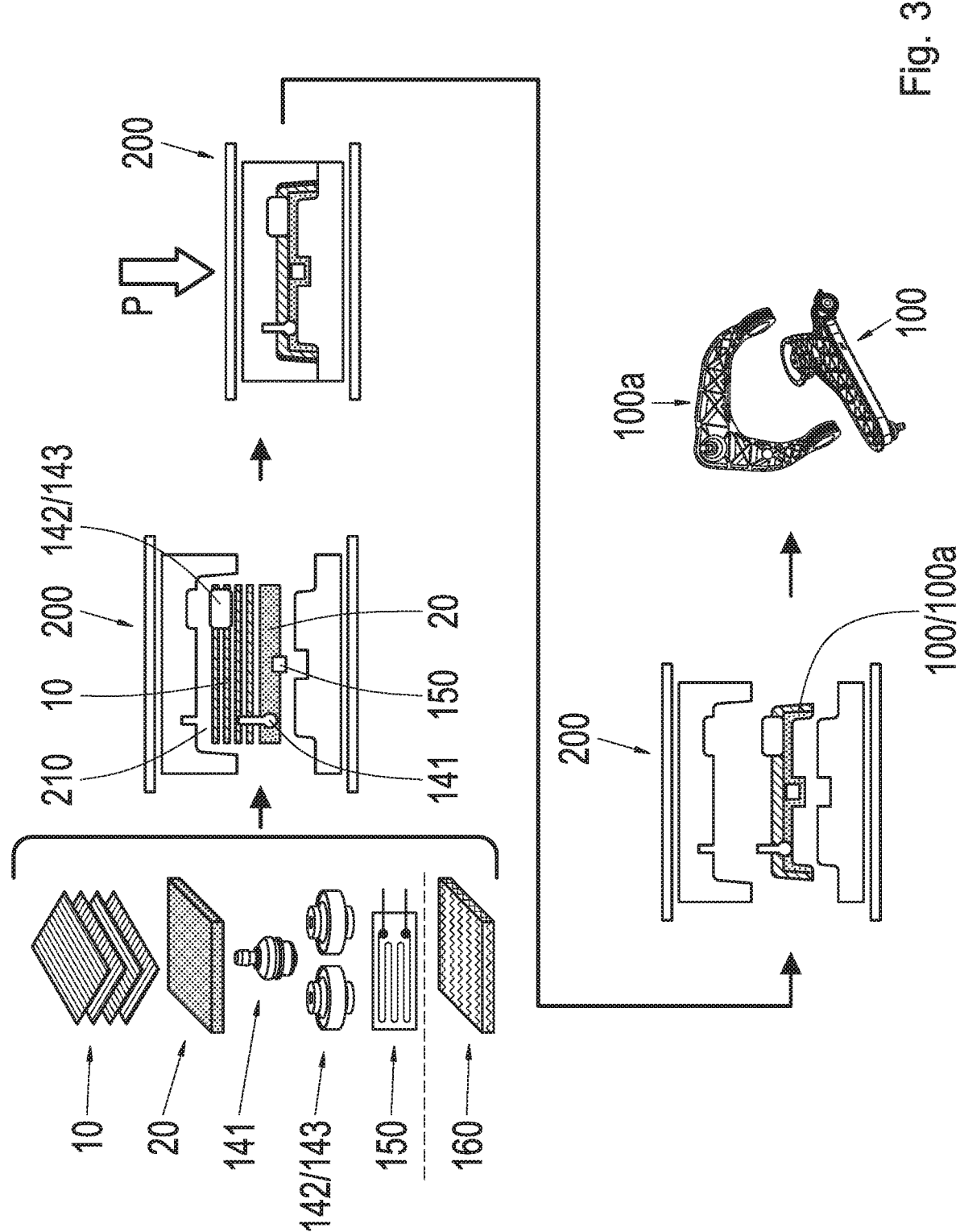
FIG. 3 illustrates the production process for a chassis component according to FIGS. 1 and 2.

The steering elements 100 and 100a are produced as integral components by means of compression molding (hot compression), as illustrated in FIG. 3. The following components (elements) are needed and provided for the production process:

At least one blank 10 made of numerous continuous fiber layers, in particular with different fiber orientations. The blank 10 can be pre-shaped, as described above. The blank 10 can also have holes for bearing seats.

A thermosetting plastic material with short and/or long fibers, in particular a fiber-matrix semi-finished product (e.g. an SMC or BMC) 20.

Bearing elements, e.g. ball pins 141 and rubber bearings 142/143.

At least one load sensor 150.

Optionally, at least one elastomer layer 160 (see explanations above).

The components are placed in the cavity 210 of an open compression mold 200. Instead of a pre-fabricated blank 10, a layered construction can also be obtained directly in the cavity 210 of the compression mold 200 (so-called "draping"). The compression mold 200 is subsequently closed. The blank 10 can be shaped when the compression mold 200 is closed. A compression process P is then carried out in the closed compression mold 200. The bowl-shaped reinforcement structure 110 is formed by the blank 10 containing continuous fibers, and the ribbed stiffening structure 120 is formed by the thermosetting plastic material 20 containing short and/or long fibers. The cavity 210 of the compression mold 200 is shaped accordingly. Reference is also made to the explanations above. After the thermosetting plastic material is cured, the compression mold 200 is opened and the integral chassis component 100 or 100a is removed therefrom.

The integral steering element 100 and 100a can also be produced through injection molding or suchlike. The process sequence is then analogous to the process sequence shown in FIG. 3, wherein the thermosetting plastic material 20 containing short and/or long fibers is first injected into the cavity 210 when the compression mold 200 is closed.

Figures 4A, 4B, 4C:
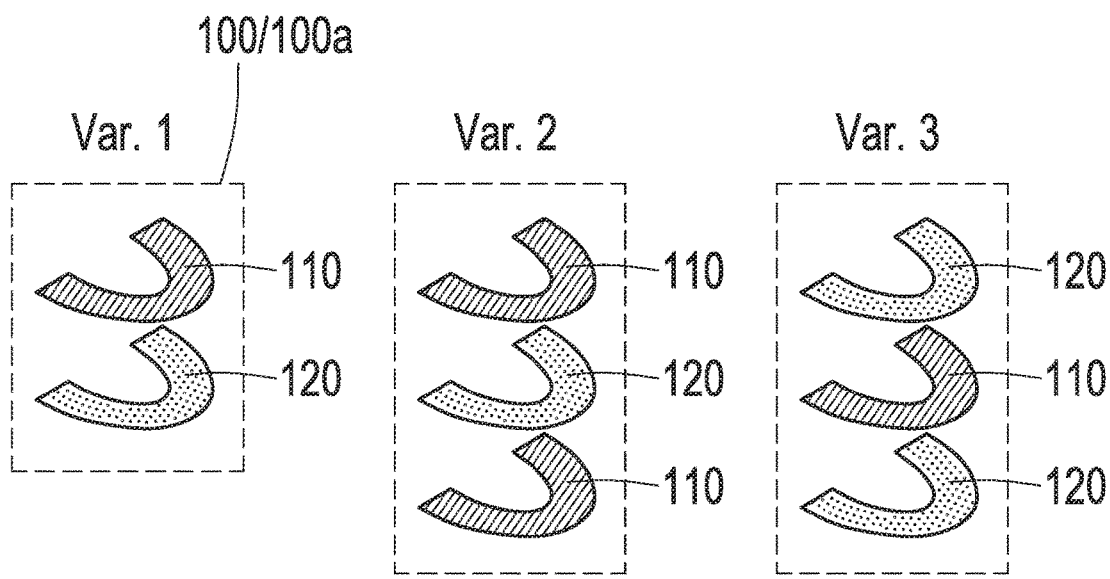
FIG. 4 schematically illustrates possible configurations of reinforcement and stiffening structures in a chassis component.

FIG. 4 schematically shows possible designs or variations of an integral chassis component obtained through various configurations of reinforcement areas reinforced with continuous fibers or continuous fiber-reinforcement structures 110, and stiffening areas reinforced with short and/or long fibers, or short/long fiber-stiffening structures 120. The variation Var. 1 shown in FIG. 4a corresponds to the possible embodiments of a chassis component 100/100a with a reinforcement structure 110 reinforced with continuous fibers and a stiffening structure 120 reinforced with short and/or long fibers shown in FIG. 1 and FIG. 2. The variation Var. 2 shown in FIG. 4b has a sandwich construction with two outer reinforcement structures 110 and an inner stiffening structure 120. The two outer reinforcement structures 110 can be combined to form a full shell. The variation Var. 3 shown in FIG. 4c also has a sandwich construction, but with two outer stiffening structures 120 and an inner reinforcement structure 110. Other variations are also possible.

Figure 5A:
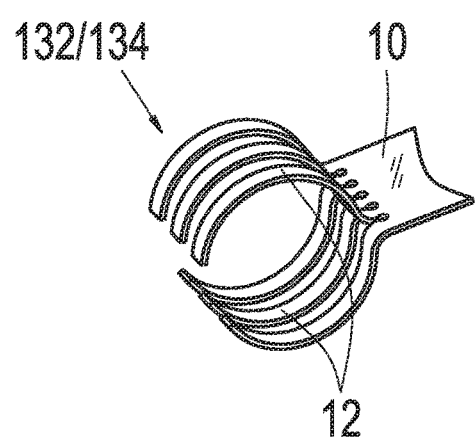
FIG. 5 shows two possibilities for continuous fiber-reinforcement of a bearing bushing on a chassis component.
Figure 5B:
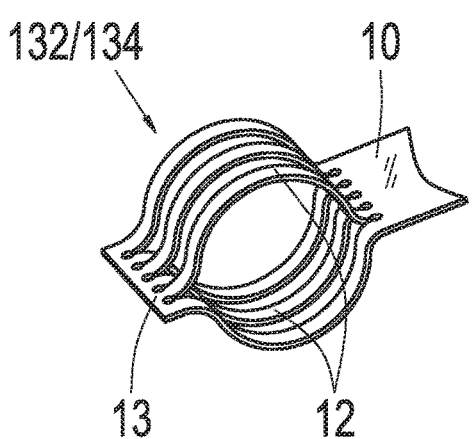
Figure 6A:
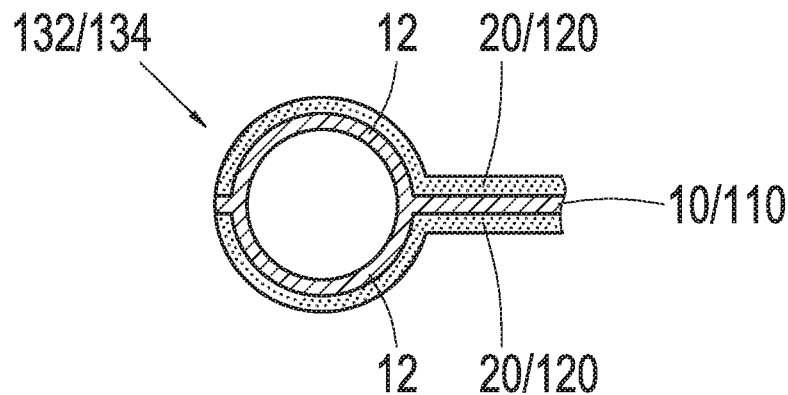
FIG. 6 schematically illustrates different possible embodiments of a bearing bushing with a continuous fiber-reinforcement and short and/or long fiber-reinforcement on a chassis component.

FIG. 5 shows two preferred possibilities for the continuous fiber-reinforcement of the bearing bushings 132 and 134. The blank 10 containing continuous fibers is cut in strips. In the embodiment shown in FIG. 5a, the strips 12 are unattached at their ends. In the embodiment shown in FIG. 5b, the strips 12 are connected at their ends by a cross-strip 13. The strips 12 form a bushing in that they have complimentary curvatures, or a semicircular bend. The reinforcement cage or sheath formed in this manner by the strips 12 containing continuous fibers is then stiffened during the compression process P in the compression mold 200 by the thermosetting plastic material 20 containing short and/or long fibers, as shown schematically in FIG. 6a, for example. The bearing bushings 132/135 can also be ribbed, in particular on their outer surface, as shown in FIG. 1 and FIG. 2. The continuous fiber strips 12 located in the bushing walls basically encompass the bore of the bushing or the bushing interior space, and improve the force fit. This construction is particularly suitable for a horizontal bearing bushing (see bearing receivers or bearing bushings 132/134 in FIG. 1 and FIG. 2).

Figure 6B:
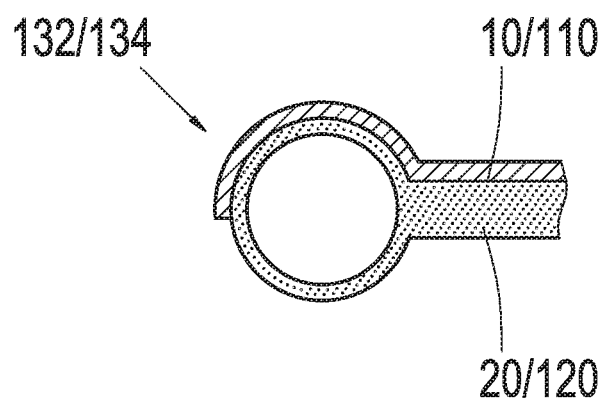
Figure 6C:
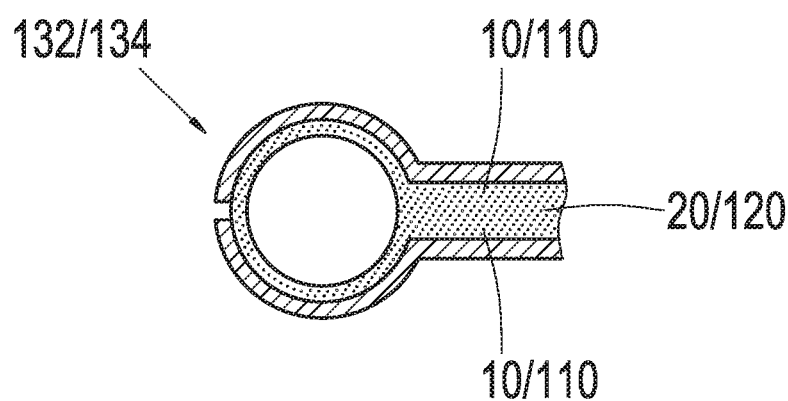

FIG. 6b and FIG. 6c show further possible embodiments for a bearing bushing 132/134, without stripped cuts in the blank 10. Two blanks 10 are used for the variation shown in FIG. 6c, analogous to the variation shown in FIG. 4b. Further embodiments or variations are also possible.

REFERENCE SYMBOLS 10 blank
12 strips
13 cross-strip
20 plastic material
100 steering element
110 reinforcement structure
120 stiffening structure
131 bearing receiver
132 bearing receiver
133 bearing receiver
134 bearing receiver
141 ball pin
142 rubber bearing
143 rubber bearing
150 load sensor
160 elastomer layer
200 compression mold
210 cavity
P compression process

The invention claimed is:

1. A fiber-reinforced plastic chassis component comprising a steering element,
wherein the steering element comprises at least one reinforcement structure formed with continuous fibers,
wherein the steering element comprises at least one stiffening structure formed with short and/or long fibers,
wherein the at least one reinforcement structure is formed integrally with the at least one stiffening structure via a thermosetting matrix material, and
wherein the steering element comprises a plurality of bearing receivers integrated in at least one of the at least one reinforcement structure and the at least one stiffening structure for receiving bearing elements,
wherein at least one bearing receiver of the plurality of bearing receivers includes a plurality of strips, wherein a first strip of the plurality of strips extends around a first side of a bearing opening to form a first portion of a bushing, and wherein a second strip of the plurality of strips extends around a second side of the bearing opening to form a second portion of the bushing, and
wherein the reinforcement structure includes a half-shell formed by a plurality of continuous fiber layers, and wherein the stiffening structure is a ribbed structure formed in the half-shell.

2. The chassis component according to claim 1, wherein the reinforcement structure has a plurality of continuous fiber layers, wherein each continuous fiber layer of the plurality of continuous fiber layers includes a different fiber orientation.

3. The chassis component according to claim 1, wherein the stiffening structure is a ribbed structure.

4. The chassis component according to claim 1, wherein the chassis component includes at least one integrated load sensor.

5. A fiber-reinforced plastic chassis component comprising a steering element, comprising:
a reinforcement structure that at least partially forms the steering element, wherein the reinforcement structure is formed with fibers; and
a stiffening structure that at least partially forms the steering element, wherein the stiffening structure is formed with fibers,
wherein the reinforcement structure is formed integrally with the stiffening structure via a common thermosetting matrix material,
wherein the steering element comprises a plurality of bearing receivers formed integrally with at least one of the reinforcement structure and the stiffening structure, and wherein at least one bearing receiver of the plurality of bearing receivers forms a bushing formed of at least two strips having complimentary curvatures to surround a bearing opening, and
wherein the reinforcement structure includes a half-shell formed by a plurality of continuous fiber layers and the stiffening structure is located within a cavity of the half-shell.

6. The chassis component of claim 5, wherein each bearing receiver of the plurality of bearing receivers includes an integrally-formed bushing that is configured for receiving at least one bearing element.

7. The chassis component according to claim 5, wherein the reinforcement structure has a plurality of continuous fiber layers, and wherein each continuous fiber layer of the plurality of continuous fiber layers includes a different fiber orientation.

8. The chassis component according to claim 5, wherein the stiffening structure includes a ribbed structure.

9. The chassis component according to claim 5, wherein the stiffening structure includes a ribbed structure formed in the cavity of the half-shell.

10. The chassis component according to claim 5, wherein the chassis component includes at least one integrated load sensor.

11. The chassis component according to claim 5, wherein the strips are unattached at their ends.

12. The chassis component according to claim 5, wherein the strips are connected at their ends by a cross-strip.

* * * * *